(12) United States Patent
Zhang et al.

(10) Patent No.: US 7,785,748 B2
(45) Date of Patent: Aug. 31, 2010

(54) NANO-BASED GAS DIFFUSION MEDIA

(75) Inventors: Feng-Yuan Zhang, Newark, DE (US);
Ajay K. Prasad, Newark, DE (US);
Suresh Advani, Newark, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 11/731,968

(22) Filed: Apr. 2, 2007

(65) Prior Publication Data

US 2007/0238010 A1    Oct. 11, 2007

Related U.S. Application Data

(60) Provisional application No. 60/788,873, filed on Apr. 3, 2006.

(51) Int. Cl.
*H01M 2/00* (2006.01)
*H01M 4/00* (2006.01)

(52) U.S. Cl. ................ 429/480; 429/492; 429/523; 502/100

(58) Field of Classification Search ............ 430/207.1, 430/313; 428/338; 427/115; 429/44, 26, 429/34, 42, 40–41; 252/182.1; 210/500.21; 422/199, 232
See application file for complete search history.

(56) References Cited

U.S. PATENT DOCUMENTS

| | | | |
|---|---|---|---|
| 5,861,222 A * | 1/1999 | Fischer et al. ................ 429/42 |
| 6,232,010 B1 * | 5/2001 | Cisar et al. ................... 429/40 |
| 6,468,657 B1 * | 10/2002 | Hou et al. ................... 428/403 |
| 6,818,117 B2 * | 11/2004 | Ferguson et al. ............ 205/316 |
| 7,088,571 B2 * | 8/2006 | Nakamura et al. .......... 361/502 |
| 2003/0142901 A1 * | 7/2003 | Lahann et al. ................ 385/18 |
| 2003/0211407 A1 * | 11/2003 | Watanabe et al. ............. 430/17 |
| 2004/0096572 A1 * | 5/2004 | Chen et al. .................. 427/115 |
| 2004/0170880 A1 * | 9/2004 | Nagoshi et al. .............. 429/34 |
| 2005/0221081 A1 * | 10/2005 | Liu et al. .................... 428/338 |
| 2005/0233203 A1 * | 10/2005 | Hampden-Smith et al. .... 429/44 |
| 2005/0260473 A1 * | 11/2005 | Wang .......................... 429/33 |

OTHER PUBLICATIONS

Mathias, Mark, et al., Chapter 46, "Diffusion Media Materials and Characterisation"; Handbook of Fuel Cells—Fundamentals, Technology and Applications, vol. 3 (2003); pp. 1-21.

(Continued)

*Primary Examiner*—Dah-Wei D Yuan
*Assistant Examiner*—Claire L Rademaker
(74) *Attorney, Agent, or Firm*—McCarter and English

(57) ABSTRACT

The present invention relates to novel methods for producing a nano-porous gas diffusion media, compositions thereof, and devices comprising the same. The nano-porous gas diffusion media of the invention is produced using photolithographic techniques to create a solid substrate comprising a plurality of nano-scale (1 nm-300 μm) pores or holes that allow for the diffusion or exchange of molecules, gases, and/or liquids through the substrate. The nano-porous diffusion media of the invention also displays superior electro- and thermal conductivity, and increased durability and performance. In some embodiments, the nano-porous diffusion media of the invention is also coated with a self-assembling monolayer (SAM) of organic molecules to further improve its physical characteristics.

15 Claims, 14 Drawing Sheets

OTHER PUBLICATIONS

Zhang, F.Y., et al., "Liquid Water Removal from a Polymer Electrolyte Fuel Cell"; Journal of the Electrochemical Society, 153 (2), (2006); pp. A225-A232.

Lee, Woo-kum, et al., "The Effects of Compresssion and Gas Diffusion Layers on the Performance of a PEM Fuel Cell"; Journal of Power Sources 84 (1999); pp. 45-51.

Lin, Guangyu, et al., "Effect of Thickness and Hydrophobic Polymer Content of the Gas Diffusion Layer on Electrode Flooding Level in a PEMFC"; Journal of The Electrochemical Society, 152 (10), 2005; pp. A1942-A1948.

Passalacqua, E., et al., "Effects of the Diffusion Layer Characteristics on the Performance of Polymer Electrolyte Fuel Cell Electrodes"; Journal of Applied Electrochemistry 31, (2001), pp. 449-454.

Benziger, Jay, et al., "Water Flow in the Gas Diffusion Layer of PEM Fuel Cells"; Journal of Membrane Science 261 (2005); pp. 98-106.

* cited by examiner (a)     (b)

NANO-BASED GAS DIFFUSION MEDIA

CROSS-REFERENCE TO RELATED APPLICATIONS

Under 35 U.S.C. §119(e) this application claims the benefit of U.S. Provisional Application No. 60/788,873 filed Apr. 3, 2006, which is hereby incorporated by reference in its entirety.

FIELD OF THE INVENTION

The present invention relates to compositions and methods for producing gas diffusion media with improved physical characteristics, and optionally includes the application of a self-assembled monolayer (SAM) of organic molecules that result in improved durability and gas diffusion properties.

BACKGROUND

The fuel cell has tremendous promise as a future power system due to its low pollution, low noise, and high efficiency. Fuel cells convert a fuel and an oxidizing agent, spatially separated from each other, into electricity, heat and water at two electrodes (i.e., the anode (−) and the cathode(+)). Fuel cells are also suitable for use as energy converters in transportation and portable energy devices because of their compact structural design, power density, high efficiency, and little or no emission.

A typical fuel cell unit consists of a stack of individual fuel cells; the actual number of cells depends on the power needs. With reference to FIG. 1, the fuel cell typically includes flow field bipolar plates (stippled) (graphite composite or metal plates, as examples) that are stacked one on top of the other. The plates may include various surface flow field channels and/or orifices to, for example, route the reactants and products through the fuel cell stack (arrows). They also act as current collectors. A polymer electrolyte membrane (PEM), often called a proton exchange membrane, which permits only protons to pass between an anode and a cathode of the fuel cell, is sandwiched between each anode and cathode flow field plate. Electrically conductive gas diffusion layers (GDLs) are located on each side of the PEM and the bipolar plate to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). Typically MEA is constructed by painting a carbon GDL particle with platinum catalyst on the PEM.

In a hydrogen fuel cell, hydrogen or a hydrogen-rich gas/liquid is used as the fuel and oxygen or air as the oxidizing agent. The bipolar plates, which form the flow field for the reactant and product, and house the coolant channels, collect the current produced in the cell and transmit it to the external circuit (or to the next cell in the stack).

Currently available GDLs are comprised of carbon fiber paper or carbon fiber cloth, as shown in FIG. 2. However, the carbon fiber gas diffusion media do not meet long-term requirements for fuel cell performance, durability, and cost. For example, carbon fiber GDLs suffer from difficulty in controlling the pore parameters and the pore sizes distribute randomly. In addition, the carbon fiber GDLs are generally made hydrophobic by treating with PTFE (i.e., Teflon), which increases their weight from 5 to 30%. These treatments also reduce both electronic and thermal conductivity. During operation the GDL is normally under compressive stress, which reduces thickness, and decreases the porosity and permeability of carbon paper or carbon cloth by up to 50%. These shortcomings limit the durability of the GDL, and the fuel cell.

The GDL is very important to the overall operation of the fuel cell and effective diffusion media promotes a uniform current distribution at the adjacent catalyst layer. More particularly, the GDL performs the following key functions: (1) provides reactant gas access from flow-field channels to catalyst layers; (2) provides passage for removal of product water from catalyst-layer area to flow-field channels; (3) provides electronic conductivity from bipolar plates to catalyst layers; (4) provides for efficient heat removal from MEA to bipolar plates where coolant channels are located; and (5) provides mechanical support to the MEA in case of reactant pressure difference between the anode and cathode gas channels, maintain good contact (i.e., good electrical and thermal conductivity) with the catalyst layer, and not compress into the channels resulting in blocked flow and high channel pressure drops.

Many fuel cell membranes need to be maintained in a hydrated state to function properly. It is especially important to maintain membrane hydration while a fuel cell is operated, since proton conductivity is increased with membrane hydration. However, in some cases the reactants flowing through a fuel cell may become subsaturated with water as they are heated by the fuel cell reaction, and may thus tend to dry out the PEM; resulting in permanent damage to the PEM. Dry areas can also eventually spread until a PEM no longer functions at all. For this reason, fuel cell reactants in such systems are generally saturated with water vapor before they are supplied to the fuel cell.

It should also be noted that the fuel cell reaction produces product water besides heat at the cathode side of the PEM. Excess product water (in excess of the amount required to keep the reactants and PEM saturated) must be removed in order to prevent blockage of the flow field channels and flooding on gas diffusion layers and the catalyst layer that could prevent reactant gasses from reaching reaction sites. Various water management methods have been used to address these issues. For example, a coolant associated with a fuel cell may be circulated to control the temperature rise of the reactants flowing through the flow field channels such that the reactant streams remain saturated as they remove product water formed in the cells. In some cases, subsaturated reactants may be flowed through a fuel cell for a period to dry out the cell when it appears "flooded" by excess water. Water tends to diffuse rapidly through most PEMs, so that a subsaturated reactant flow on one side of the PEM can serve to remove excess water from both sides of the PEM. The flow rate of reactant flowed through the fuel cells relative to the electrical load on the cells (also referred to as reactant stoichiometry or "stoich") may also be increased to help remove water from the cells.

Interestingly, the pore-size distribution of the GDL plays an important role in improving cell performance and minimizing the effect of mass-transport limitation. Thus, the issues of flooding and mass-transport limitation under steady-state and transient (e.g., start-up) conditions demand careful GDL design. Currently, it widely believed that if the pores of the GDL are aligned in a straight configuration (as compared to mesh-like interconnectivity) the water would freely drain out once water flow had been initiated.

Thus, there is a continuing need to improve fuel cell durability, design, and efficiency in a robust, cost-effective manner.

SUMMARY

The present invention is directed to a diffusion media produced by the steps comprising: providing a solid substrate; coating the substrate with a photoresist; patterning the photoresist by exposing the coating with a design mask; developing the photoresist; etching the substrate; and stripping the photoresist layer from the substrate, wherein the process yields a porous diffusion media having a plurality of pores or holes in the substrate having a size from about 1 nm to about 300 μm, and wherein the porous diffusion media allows for the passage, therethrough, of at least one of a liquid, gas, ion, molecule or a combination thereof.

The present invention is also directed to a diffusion media comprising a substrate having first planar surface, and a second planar surface opposite to the first planar surface, wherein the diffusion media further comprises a plurality of non-overlapping pores or holes having a size of from about 1 nm to about 300 μm, and wherein the pores are substantially perpendicular to the first and second planes such that the first planar surface is in gaseous or fluid communication with the second planar surface, and wherein the porous diffusion media allows for the passage, therethrough, of at least one of a liquid, gas, ion, molecule or combination thereof.

The present invention is further directed to a process for producing a diffusion media comprising the steps of:

providing a solid substrate; coating the substrate with a photoresist; patterning the photoresist by exposing the coating with a design mask; developing the photoresist; etching the substrate; and stripping the photoresist layer from the substrate, wherein the process yields a porous diffusion media having a plurality of pores or holes in the substrate having a size from about 1 nm to about 300 μm, and wherein the porous diffusion media allows for the passage, therethrough, of at least one of a liquid, gas, ion, molecule or a combination thereof.

The present invention is additionally directed to a laminar ion exchange membrane comprising a porous metallic core, and a self-assembling monolayer of organic molecules bound to the outer surfaces of the core.

Further areas of applicability of the present invention will become apparent from the detailed description, drawings, and claims provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

The present invention relates to the discovery that MEMS/NANO technology provides advantages for fuel cell design and function. For example, the application of nanotechnology to fuel cell design offers better thermal and electrical conductivity, mass transport, and permeability. In particular, MEMS/NANO technology offers distinct advantages, including high precision, good repeatability, and consistency in batch-production. Micro/nano fabrication equipment can easily etch a pattern with feature resolution of less than one micrometer. In addition to silicon, new technology and tools have been recently developed for fabricating such features on metallic materials.

Figure 1:
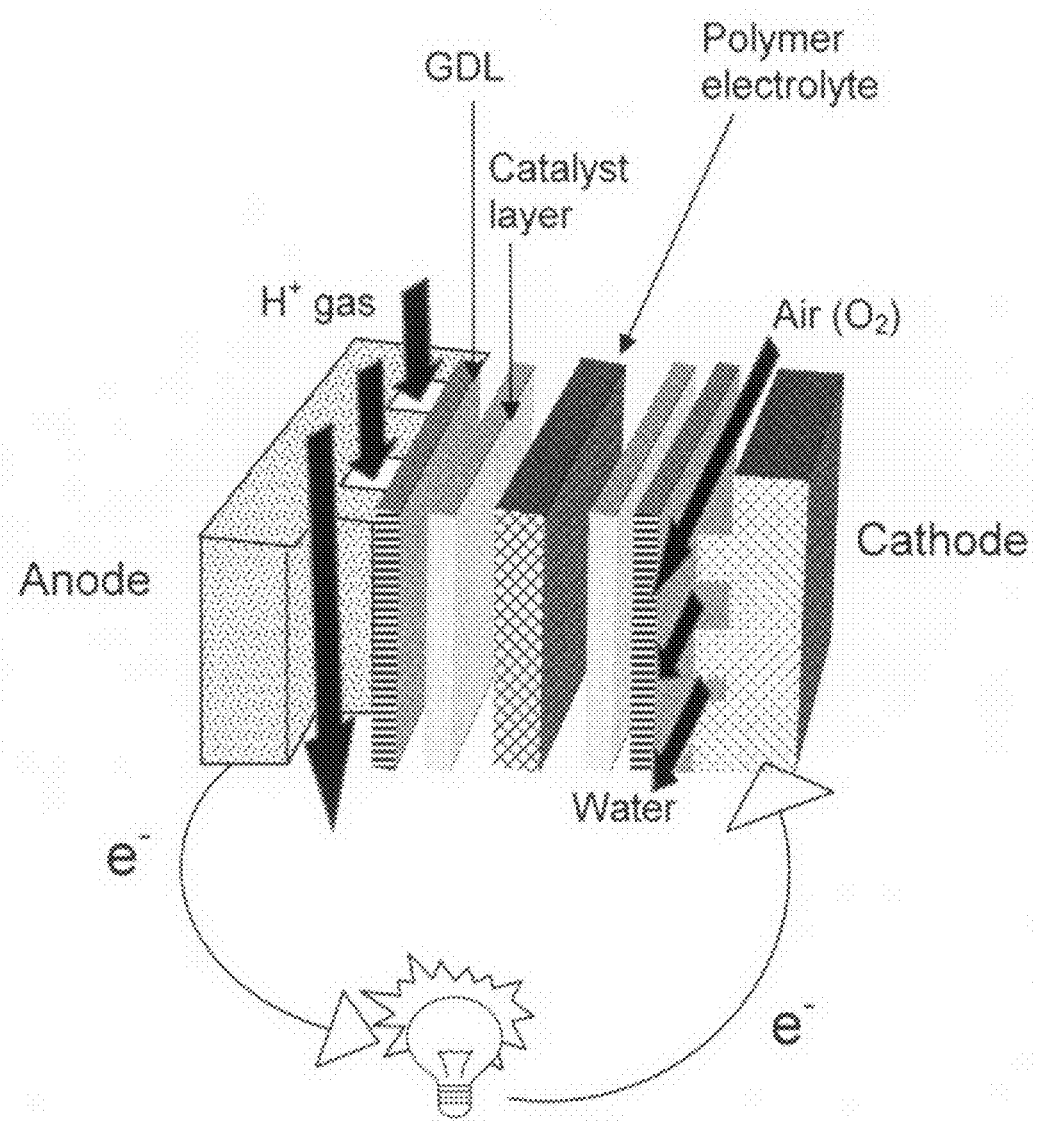
FIG. 1. Exploded view of a the basic arrangement of elements in a typical proton exchange-type fuel cell. Hydrogen fuel is channeled through field flow plates to the anode on one side of the fuel cell, while oxygen from the air is channeled to the cathode on the other side of the cell. At the anode, a catalyst, for example, platinum, causes the hydrogen to split into hydrogen ions (protons) and negatively charged electrons. The polymer electrolyte membrane (PEM) allows only the positively charged ions (e.g. hydronium ions) to pass through it to the cathode. The negatively charged electrons must travel along an external circuit to the cathode crating an electrical current. At the cathode, the electrons and positively charged hydrogen ions combine with oxygen to form water, which flows out of the cell.
Figure 2:
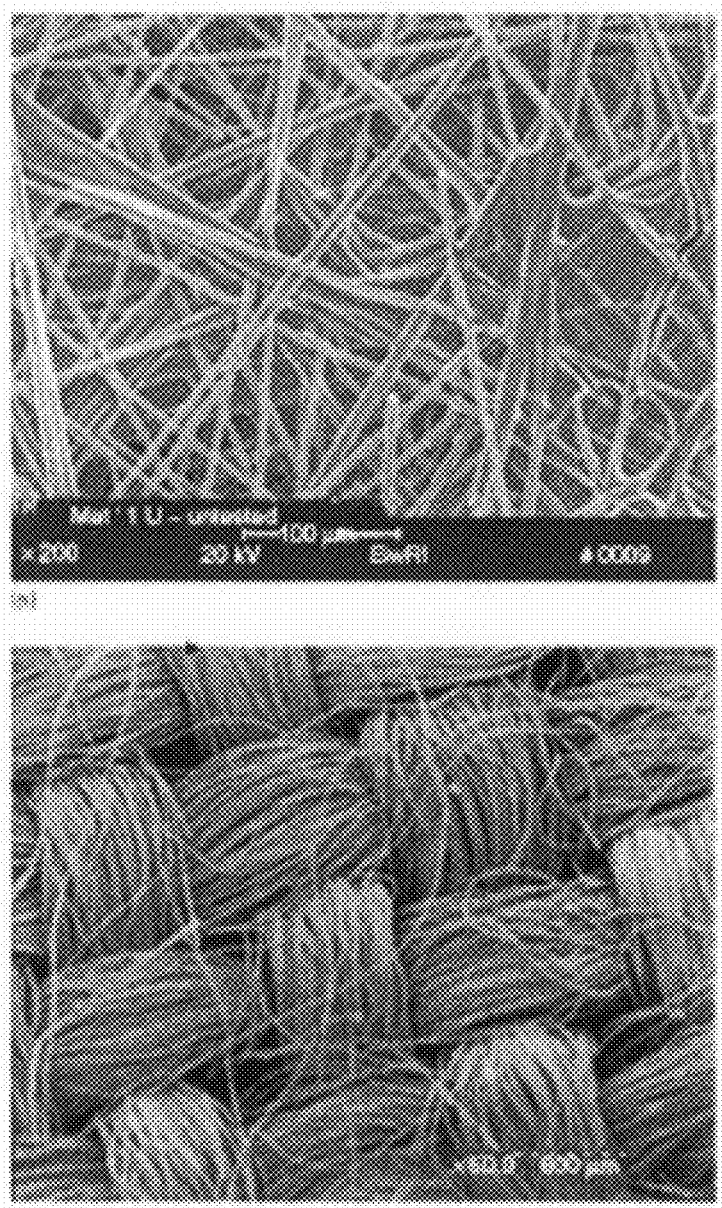
FIG. 2. Scanning electron microscope (SEM) view of the surface configuration of a typical (a) carbon paper and (b) carbon cloth gas diffusion membrane.
Figure 3:
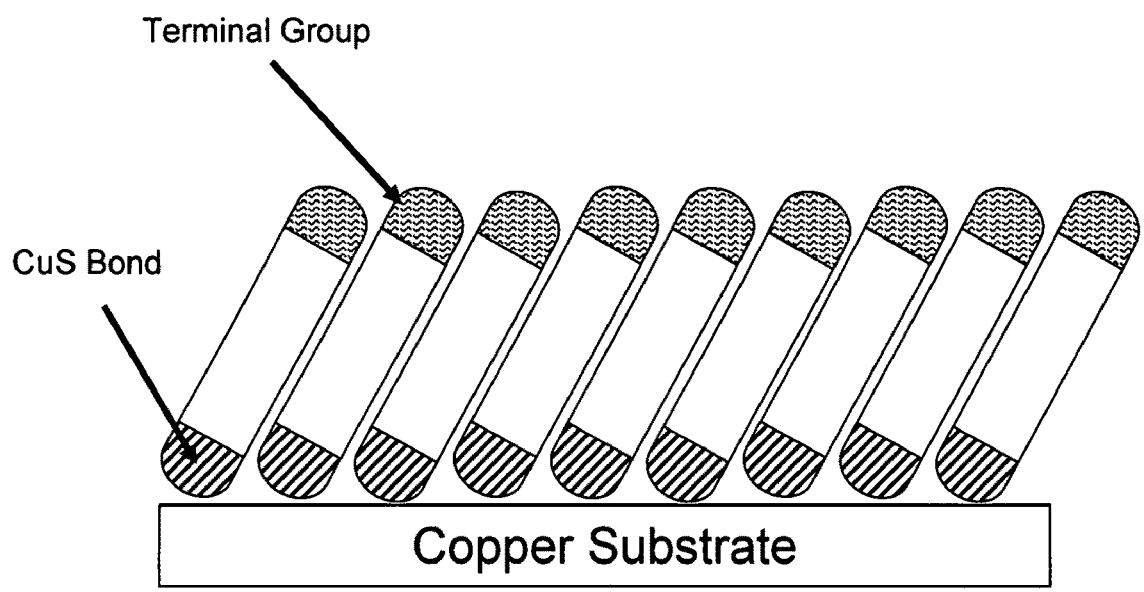
FIG. 3. Illustration depicting how self-assembling molecules (SAMs) align on a metal surface.
Figure 4:
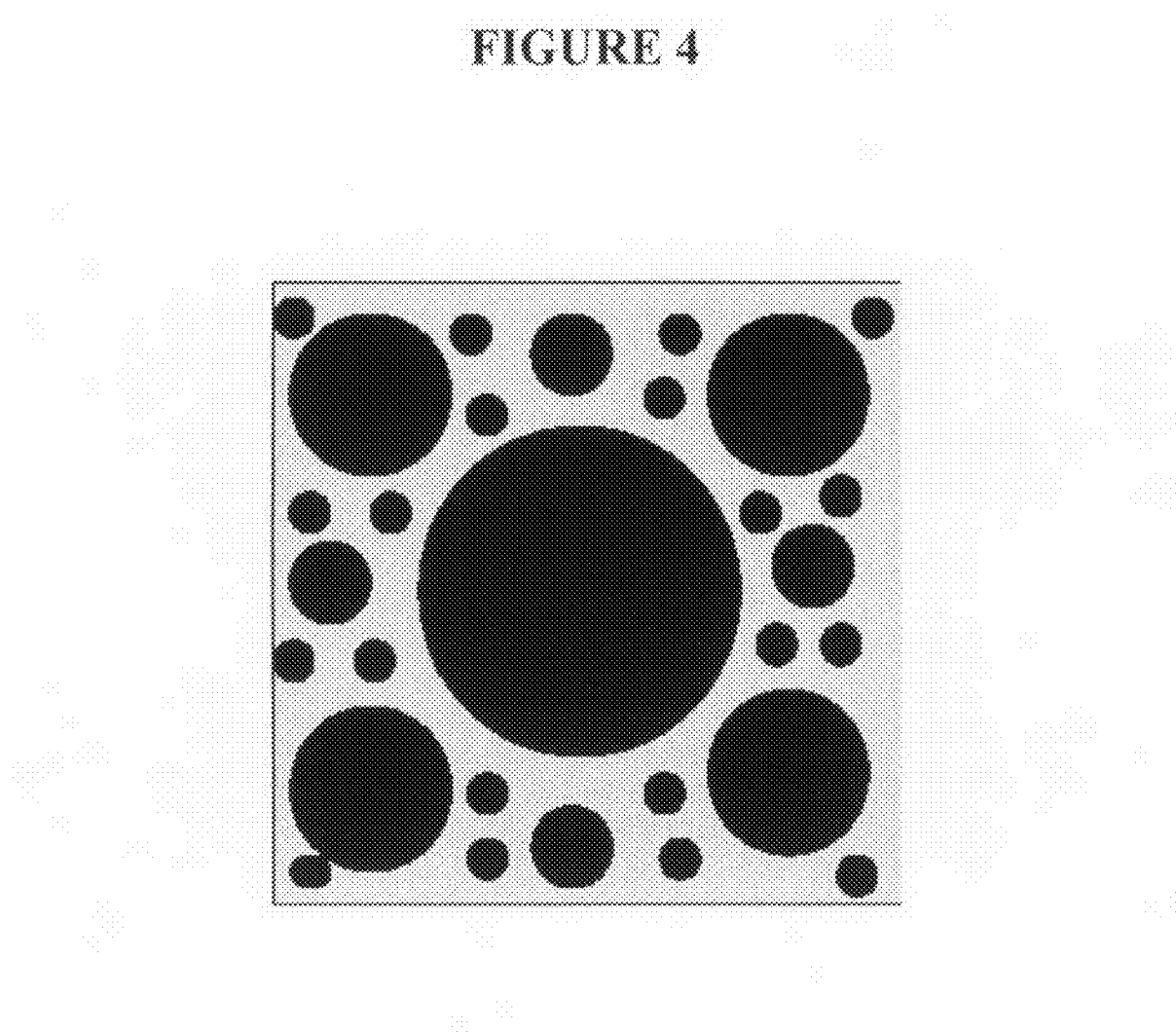
FIG. 4. Illustration showing an example of one possible pore design pattern of the SAM-based GDL of the invention.

In addition, the invention relates to the discovery that the application of a self-assembled monolayer (SAM) results in gas diffusion media with surprising and unexpected advantages over the prior art. The application of self-assembled monolayers (SAM) to metal surfaces provides the promise of surface treatments to meet the unique needs in fuel cells. SAMs are easily formed, resilient and stabile. In addition, SAMs strongly bond with metal atoms of the solid surfaces permitting good adherence of the molecule to the surface, have long lifetimes, and prevent metal from corrosion/erosion (FIG. 3). Because the self-assembled monolayers have thickness of the order of 10 angstroms (Å), they present negligible resistance to thermal and electronic conduction, and do not alter other characteristics of the substrate. Furthermore, the hydrophobicity and hydrophilicity of the substrate surface can be precisely controlled by carefully selecting a SAM group to improve water transport in the fuel cell.

As used herein, "self-assembled monolayer" or "SAM" refers to a thin, highly ordered, organic film that is formed spontaneously by adsorption of pre-designed organic precursors from the solution or vapor phase to the surface of an appropriate solid substrate. Self-assembly occurs primarily in long chain hydrocarbon molecules adsorbed on surfaces. The process starts, for example, with chemisorption of an anchoring headgroup possessed by precursor molecules and eventually produces a two-dimensional, highly ordered, thin layer. The anchoring group mediates the binding of the molecule to the substrate.

Anchoring groups include, for example, carboxylates, amines, siloxanes, and thiolates. The hydrocarbon chain molecules may also carry functional groups that can act as chemical tethers for pharmaceuticals or polymers, including for example, biopolymers that can be used in medical devices. The specific SAM selected will depend on several considerations including, the particular system in which the diffusion media will be operating, the solid substrate, and the anchoring group. Table 1 contains a non-limiting list of examples of anchoring group/SAM/substrate combinations that are well within the scope of the present compositions and methods of the invention.

As used herein, "solid substrate" refers to a rigid or flexible solid material or substantially solid material, with or without pores, and encompasses, for example, a sheet, a plate, a foil, a wafer, and the like, comprised of a material suitable for binding the particular headgroup of a SAM molecule. For example, materials useful as a solid substrate include metals, such as, for example, copper, gold, silver, platinum, tin, aluminum, and alloys; zeolites and ceramics, such as silicates; cermets; plastics, and organic polymers, for example, vinyls, styrenes, propylenes, ext . . . . In certain embodiments of the invention, the solid substrate is a metallic wafer with a thickness of less than about 0.1 mm. "Porosity" as used herein, defines the percentage of the surface area of the solid substrate that contains a pore or a hole after etching according to the methods of the invention.

TABLE 1

Examples of Anchoring Group/SAM/Substrate Combinations.*

| Anchoring Group | Self-Assembling Monolayer (SAM) Molecule Type | Solid Substrate |
|---|---|---|
| Carboxylate | Alkanoic acid Perfluorocarboxylic acid | Aluminum or Silver Silver |
| Amine | Substituted alkyl amine | Platinum or Tin |
| Siloxane | Alkyltrichlorosilane | Silicon, Gold or Tin |
| Thiolate | Alkanethiol, Thiol-terminated peptide, dialkyl sulfide and disulfide, aromatic thiol and disulfide | Gold, Silver, Platinum or Copper |

*Adapted from, Kato, K. "Self-Assembled Monolayers." Encyclopedia of Biomaterials and Biomedical Engineering, p 1331-1339 (2004), which is hereby incorporated by reference in its entirety.

As used herein, "etching" or "wet etching" are used interchangeably and refer generally to the process of chemically removing material. For example, wet etching can be performed by immersing the substrate, for example, a metal wafer, in a liquid bath of chemical etchant. Types of chemical etchants include, for example, isotropic etchants, and anisotropic etchants. Isotropic etchants attack the material being etched at the same rate in all directions. Anisotropic etchants attack the material being etched at different rates in different directions. Anisotropic etching does not cause undercutting, and is preferred in applications where straight side walls are essential. Etchants and techniques for their use are well known in the art. For example, one of the most widely used anisotropic etchants is potassium hydroxide (KOH).

As used herein, "photoresist" (PR) refers to a light sensitive material used in photolithographic processes that becomes soluble ("positive resist") or relatively insoluble ("negative resist") upon exposure to UV radiation, electron beams or light. The unresolved portion of the photoresist is dissolved by the photoresist developer. Examples of photoresists include polyhydroxystyrene-based polymers with a photo-acid generator; a common positive photoresist is a mixture of diazonaphthoquinone (DNQ) and novolac resin (a phenol formaldehyde resin), and is developed dissolution in a basic solution, for example, tetra-methyl ammonium hydroxide. In some of the embodiments of the present invention, RD-41 (RD Chemical Company; www.rdchem.com), is used as the photoresist developer. In certain embodiments, the invention includes the use of negative photoresists. The negative photoresist is selectively hardened by illuminating it in specific places. For this purpose a transparent plate with patterns printed on it, called a photomask or shadowmask, is used together with an illumination source to shine light on specific parts of the photoresist.

As used herein, "photolithography" or "nanolithography" refers to the general process of transferring a pattern or photomask (i.e., reticle), on a nanometer scale (from 100 microns to the size of a single atom) to the surface of a substrate, for example, a metal wafer. Photolithography comprises a combination of steps including substrate preparation, photoresist application, drying, exposure, developing, and etching.

As used herein, the term "contact angle" refers to the measure of the wetting of a liquid on a solid surface. It is expressed in degrees, with 0° being complete wetting and 180° being absolute non-wetting. One equation used to express contact angle in terms of the properties of a given solid and liquid is as follows: $\cos(\theta)=(\delta P^* r)/2\gamma$. Where "$\theta$" is the contact angle, "$\delta P$" is the differential pressure to drive liquid into solid, "r" is the pore size of the solid, and "$\gamma$" is the surface tension of the liquid.

As used herein, "fuel cell" refers generally to devices which produce electricity from an electrochemical reaction, and includes, for example, phosphoric acid (PAFC) fuel cells, hydrogen or proton exchange membrane fuel cells (PEMFC), molten carbon fuel cells (MCFC), solid oxide fuel cells (SOFC), alkaline fuel cells, direct methanol fuel cells (DMFC), regenerative fuel cells, zinc-air fuel cells (ZAFC), protonic ceramic fuel cells (PCFC), and the like. Fuel cells, as a means of generating power, have various advantages of conventional power sources, such as combustion engines or batteries. Some advantages include, reducing or elimination pollution generated by burning fossil fuels, elimination of greenhouse gases; readily available reagents, higher efficiency than combustion engines, longer operation times than conventional batteries, and simple maintenance. For a detailed discussion of PEMFCs see Mathias, M. F., Roth, J., Fleming, J. & Lehnert, W., *Handbook of Fuel Cells—Fundamental, Technology and Application*, eds W. Vielstich, A. Lamm & H. A. Gasteiger, Volume 3, John Wiley & Sons, pp. 517-537 (2003), which is hereby incorporated by reference in its entirety for all purposes.

As used herein, "flooding" or "GDL/CL flooding" refers to the common problem observed with fuel cells, particularly PEMFC fuel cells, utilizing carbon fiber based gas diffusion layers (GDLs). Flooding occurs when liquid water accumulates in the pores of the GDL, which blocks transport of oxygen into the catalyst layer (CL), covers the catalyst sites, and therefore, renders them electrochemically inactive. Flooding occurs because the PEMFC fuel cells are prone to excess liquid water formation due to water production from oxygen reduction at the cathode. Flooding is also one of the key causes of performance and durability limitations of current fuel cells.

As used herein, "diffusion" refers generally to the transport, exchange or movement of molecules, gases, liquids, ions, or other particles down a concentration gradient, either actively (i.e., facilitated by the addition of energy to the system) or passively (i.e., without the addition of energy to the system).

As used herein, "gas diffusion media" refers generally to a material capable of allowing the diffusion of liquids, gases, molecules or ions, including but not limited to gas diffusion layers (GDLs) for use in fuel cells. Although several of the examples provided herein utilize a metallic substrate for construction of the gas diffusion media, the invention is not intended to be limited to these examples. For example, materials useful as a solid substrate in constructing the gas diffusion media of the invention include metals, such as, for example, copper, gold, silver, platinum, tin, aluminum, and alloys; zeolites and ceramics, such as silicates; cermets; and plastic and polymeric based substrates.

As used herein, "mass transport limitation" refers to conditions that result in decreased fuel cell activity due to reactant-starved conditions at the electrodes in the high current density range. It arises due to slow transport of reactant to reaction sites or due to the slow transport of reactant away from reaction sites or from an inability of the chemicals to react.

In one aspect the invention relates to methods of producing gas diffusion media that are economical to manufacture, reusable, and have improved physical characteristics, for example, improved mechanical stability, conductivity, permeability, and heat tolerance. In additional aspects, the gas diffusion media compositions of the invention offer improved resistance to flooding, physical compression, and mass transport limitations.

The methods of the invention offer other additional advantages over currently available gas diffusion media. For example, the methods of the present invention provide for controlling size, distribution, and the design of GDL pores. In addition, the methods of the invention allow for a straight (i.e., independent or non-overlapping) pore configuration in the nanoporous gas diffusion media of the invention. This feature overcomes the variability in efficiency due to the random and unpredictable pore size and distribution experienced with currently available carbon fiber GDLs.

In addition to the advantages listed above, the uniformity by which nanoporous GDLs can be constructed according to the present invention allows for more accurate simulation modeling, and testing, which can greatly reduce development costs of new electrochemical and gas diffusion technologies, such as, for example, fuel cells and biomedical devices.

Therefore, in one aspect the invention relates to a method or process for producing a gas diffusion media or layer with nanotechnology-based techniques. In a first embodiment, the method of the invention relates to a process for creating a gas diffusion media with nano-scale pores or hollow channels, which provide for molecule, gas, and/or fluid diffusion, exchange or transport between opposing surfaces of the gas diffusion media. The process comprising the steps of: providing a thin solid substrate, for example, a metallic or ceramic wafer, sheet, or foil; cleaning said substrate; applying a photoresist to at least one surface of the substrate; patterning the photoresist by exposing the coating with design mask; exposing and developing the photoresist; etching pores through the substrate; and stripping the substrate of remaining photoresist.

The custom design and control of the design mask using currently available photolithographic processes allows for the generation of a gas diffusion layer with nanometer to micrometer sized pores of any desired size, shape, number, density, diameter, pattern, and the like. It is contemplated that the particular mask design selected may vary depending on any combination of factors including, the particular application, starting material, cost, desired functional parameters, and the like, which can be modified by a person of ordinary skill using the teachings and methods of the invention without undue experimentation. In addition, use of the nano-scale photolithographic technique creates non-overlapping, and optionally, variable sized pores which improves function of the gas diffusion media. As indicated previously, this non-overlapping configuration is currently believed by those in the art, to be detrimental to optimal performance of the gas diffusion media.

Fuel cell components are well known in the art. As examples, common membrane materials include NAFION™, GORESELECT™, sulphonated fluorocarbon polymers, and other materials. Various suitable catalyst formulations are also known in the art, and are generally platinum-based. Other suitable membrane materials include the polybenzimidazole (PBI) membrane available from Celanese, and polyether ether ketone (PEEK) membranes. The flow field plates are generally molded, stamped or machined from materials including carbon composites, plastics and metal alloys. The plates may include various surface flow channels and orifices to, for example, route the reactants and products through the fuel cell stack. Reactant gases from each side of the PEM pass along the flow channels and diffuse through the GDLs to reach the PEM.

In another aspect, the invention relates to methods for further modifying the diffusion characteristics of the nano-porous diffusion media through the additional step of applying a surface treatment to the nano-porous gas diffusion media. In one embodiment this aspect comprises the application of a self-assembling monolayer (SAM) of organic molecules. These molecules self-order along all exposed surfaces of the nano-porous gas diffusion media of the invention (i.e., top surface, bottom surface, side surfaces, and walls of hollow channel or pores). The particular SAM molecule applied, or combination of SAM molecules applied also depends on factors such as the particular application, cost, functional parameters, etc. and can also be modified by a person of ordinary skill according to the methods and teachings of the invention without undue experimentation.

In another aspect, the invention relates to a novel nano-porous gas diffusion media produced according to the methods of the invention. In a particular aspect, the invention relates to a nano-porous gas diffusion media comprising a solid substrate, for example, a metallic or ceramic layer, foil, sheet, plate, or wafer, wherein the substrate contains a plurality of pores or hollow channels allowing for fluid or gaseous communication between opposing surfaces of the substrate. In a preferred embodiment the solid substrate is substantially planar such that the pores or hollow channels pass transversely from one surface of the plane (e.g., a top surface) through to the other surface of the plane (e.g., a bottom surface).

It is contemplated that the pores may be of any desirable size, shape, density, diameter, configuration or design. All embodiments provided herein are given by way of non-limiting example.

In certain embodiments, the pores range in diameter from about 1 nm to about 300 μm. In another embodiment, the pores range in diameter from about 10 nm to about 100 μm. The particular pore parameters selected will depend on factors including the starting substrate material, the application or use contemplated, cost, and the like, and can be modified by a person or ordinary skill in the art utilizing the teachings of the invention without undue experimentation.

In another aspect, the invention relates to a diffusion media comprising a nano-porous substrate core layer and an outer surface-activated modification to modify the diffusion and physical characteristics of the gas diffusion media. In a preferred embodiment, the outer surface activated modification comprises a SAM of organic molecules.

A non-limiting list of examples of SAM molecules, which can be utilized in the compositions and methods of the invention, is provided in Table 1. In certain aspects, the nanoporous gas diffusion media of the invention comprises a porous substrate coated with SAM molecules having contact angles of from about 0° to about 180°. In other aspects of the invention the nanoporous gas diffusion media of the invention comprises a porous substrate coated with at least one SAM molecule having a contact angle with water of less than about 90°. In other aspects, the invention provides a nanoporous gas diffusion layer comprising a porous substrate coated with at least one SAM molecule having a contact angle with water of greater than about 90°. In still other aspects, the invention provides a nanoporous gas diffusion layer comprising a porous substrate coated with a combination of SAM molecules, each independently having a contact angle with water of from about 0° to about 180°.

The particular SAM molecule chosen may depend on a number of factors including, the substrate material used, the desired application, and functional parameters, such as, mechanical durability, electronic conductivity/resistivity, hydrophobicity/hydrophilicity, pore size, temperature tolerance, cost, and the like, and can be modified by a person or ordinary skill in the art utilizing the teachings of the invention without undue experimentation.

In another aspect, the invention provides a nanoporous gas diffusion media useful for a variety of applications including, for example, in nano-electronic devices, such as cell phone batteries, computer batteries, and fuel cells; chemical sensing; biotechnology, such as for use in cell culture, tissue culture or bioreactors; medical devices, such as, dialysis machines, respirators or implants; and wetting control and thermal protection.

In another aspect, the invention provides a fuel cell system, for example a proton exchange membrane fuel cell system (PEMFC), comprising a fuel cell with the nanoporous gas diffusion media or layer of the invention. The fuel cell system is provided that has a PEM with an anode side and a cathode side. The anode side is adapted to oxidize hydrogen, and the cathode side is adapted to react the protons with oxygen. A hydrophobic anode nanoporous gas diffusion layer is adapted to transport hydrogen and water to the cathode side of the PEM. A hydrophobic cathode gas diffusion layer adapted to transport water away from the cathode side of the PEM and away from the cathode catalyst.

In still another aspect, the invention comprises a fuel cell system, comprising a nanoporous gas diffusion layer, wherein the gas diffusion layer further comprises a surface activation modification. In certain embodiments, the surface activated modification comprises the application of an outer layer comprising a self-assembling monolayer of organic molecules. In certain embodiments of the invention, the fuel cell system comprises a nanoporous gas diffusion media, wherein the porous substrate is coated with at least one SAM molecule having a contact angle with water of less than about 90°. In other embodiments, the SAM molecule has a contact angle with water of greater than about 90°. In still other embodiments, the invention comprises a fuel cell system, wherein a nanoporous gas diffusion layer comprises a combination of two or more SAM molecules, each independently having a contact angle of from about 0° to about 180°.

Types of Fuel Cells Suitable for Use with the Gas Diffusion Media of the Invention.

PAFCs generate electricity at more than 40% efficiency, and nearly 85% of the esteam this fuel cell produces is used for cogeneration. Operating temperatures are in the range of 300 to 400 degrees F. At lower temperatures, phosphoric acid is a poor ionic conductor, and carbon monoxide (CO) poisoning of the platinum electro-catalyst in the anode becomes severe. The electrolyte is liquid phosphoric acid soaked in a matrix. One of the main advantages to this type of fuel cell, is that it can use impure hydrogen as fuel. PAFCs can tolerate a CO concentration of about 1.5 percent, which broadens the choice of fuels they can use. If gasoline is used, the sulfur must be removed. Disadvantages of PAFCs include: it uses expensive platinum as a catalyst, it generates low current and power comparably to other types of fuel cells, it produces carbon dioxide, and it generally has a large size and weight.

PEMFCs operate at relatively low temperatures (about 175 degrees F.), have high power density, can vary their output quickly to meet shifts in power demand, and are suited for applications, such as in automobiles where quick startup is required. The proton exchange membrane is a thin polymeric material that allows protons to pass through it. The membrane is coated on both sides with highly dispersed metal allow particles (mostly platinum) that are active catalysts. The electrolyte used is a solid organic polymer poly-perfluorosulfonic acid. The solid electrolyte is an advantage because it reduces corrosion and management problems. Hydrogen is fed to the anode side of the fuel cell and passes through a gas diffusion media layer wherein the catalyst causes the hydrogen atoms to release electrons and become hydrogen ions (protons). The electrons travel in the form of an electric current that can be utilized before it returns to the cathode side of the fuel ell where oxygen has been fed. A the same time, the protons diffuse through the membrane electrolyte and another gas diffusion media layer to the cathode, where the hydrogen atom is recombined and reacted with oxygen to produce water, thus completing the overall process. This type of fuel cell is, however, sensitive to fuel impurities. Cell outputs generally range from 50 to 250 kW and the only byproduct of the reaction is water.

MCFC fuel cells use a liquid solution of lithium, sodium and/or potassium carbonates, soaked in a matrix for an electrolyte. They promise high fuel-to-electricity efficiencies, about 60% normally or 85% with cogeneration, and operate at about 1,200 degrees F. The high operating temperature is needed to achieve sufficient conductivity of the electrolyte. Because of this high temperature, noble metal catalysts are not required for the cell's electrochemical oxidation and reduction processes. To date, MCFCs have been operated on hydrogen, carbon monoxide, natural gas, propane, landfill gas, marine diesel, and simulated coal gasification products. The high operating temperature serves as a big advantage because this implies higher efficiency and the flexibility to use more types of fuels and inexpensive catalysts, because the reactions involving breading of carbon bonds in larger hydrocarbon fuels occurs much faster as the temperature is increased. A disadvantage to this, however, is that high temperatures enhance corrosion and the breakdown of cell components.

SOFC fuel cells use a hard ceramic material of solid zirconium oxide and a small amount of yttria, instead of a liquid electrolyte allowing operating temperatures to reach 1,800 degrees F. Power generating efficiencies could reach 60% and 85% with cogeneration and cell output is up to 100 kW.

Alkaline cells can achieve power generating efficiencies of up to 70 percent. Their operating temperature is 300 to 400 degrees F. They use an aqueous solution of alkaline potassium hydroxide soaked in a matrix as the electrolyte. This is advantageous because the cathode reaction is faster in the alkaline electrolyte, which means higher performance. They typically have a cell output of from 300 W to 5 kW.

DMFC fuel cells are similar to the PEM cells in that they both use a polymer membrane as the electrolyte. However, the in DMFC, the anode catalyst itself draws the hydrogen from the liquid methanol, eliminating the need for a fuel reformer. Efficiencies of about 40% are expected with this type of fuel cell, which would typically operate at a temperature between 120-190 degrees F. A major problem, however, is fuel crossing over from the anode to the cathode without producing electricity.

In Regenerative fuel cells water is separated into hydrogen and oxygen by a solar-powered electrolyser. The hydrogen and oxygen are fed into the fuel cell which generates electricity, heat, and water. The water is then recirculated back to the solar-powered electrolyser and the process begins again.

ZAFC fuel cells contain a gas diffusion electrode, a zinc anode separated by electrolyte, and some form of mechanical separators. The gas diffusion electrode is a permeable membrane that allows atmospheric oxygen to pass through. After the oxygen has converted into hydroxyl ions and water, the hydroxyl ions will travel through an electrolyte, and reaches the zinc anode. Here, it reacts with the zinc, and forms zinc oxide. This process creates an electrical potential; when a set of ZAFC cells are connected, the combined electrical potential of these cells can be used as a source of electrical power. This electrochemical process is very similar to that of a PEM fuel cell, but the refueling is very different and shares characteristics with batteries. ZAFCs contain a zinc "fuel tank" and a zinc refrigerator that automatically and silently regenerates the fuel. In this closed-loop system, electricity is created as zinc and oxygen are mixed in the presence of an electrolyte (like a PEMFC), creating zinc oxide. Once fuel is used up, the system is connected to the grid and the process is reversed, leaving once again pure zinc fuel pellets. The key is that this reversing process takes only about 5 minutes to complete, so the battery recharging time hang up is not an issue. The chief advantage zinc-air technology has over other battery technologies is its high specific energy, which is a key factor that determines the running duration of a battery relative to its weight. Due to the abundance of zinc on earth, the material costs for ZAFCs and zinc-air batteries are low.

PCFC is based on a ceramic electrolyte material that exhibits high protonic conductivity at elevated temperatures. PCFCs share the thermal and kinetic advantages of high temperature operation at 700 degrees Celsius with molten carbonate and solid oxide fuel cells, while exhibiting all of the intrinsic benefits of proton conduction in polymer electrolyte and phosphoric acid fuel cells (PAFCs). The high operating temperature is necessary to achieve very high electrical fuel efficiency with hydrocarbon fuels. PCFCs can operate at high temperatures and electrochemically oxidize fossil fuels directly to the anode. This eliminates the intermediate step of producing hydrogen through the costly reforming process. Gaseous molecules of the hydrocarbon fuel are absorbed on the surface of the anode in the presence of water vapor, and hydrogen atoms are efficiently stripped off to be absorbed into the electrolyte, with carbon dioxide as the primary reaction product. Additionally, PCFCs have a solid electrolyte so the membrane cannot dry out as with PEM fuel cells, or liquid can't lead out as with PAFCs.

In a preferred embodiment, the present invention comprises a nano-based gas diffusion media, methods for preparation, and apparatuses for its use thereof, which overcome the shortfalls of the currently available, and widely used gas diffusion media, such as, for example, carbon fiber diffusion media. As such, in one aspect the invention relates to a novel gas diffusion media that has improved qualities (Table 2) such as, for example, improved mechanical stability; controlled pore size, density, and configuration; decreased thickness and weight; improved heat tolerance, electronic conductivity, and permeability; increased resistance to flooding, mass transport limitations, and/or physical compression; and is cheaper to manufacture.

TABLE 2

Typical properties of carbon-fiber paper diffusion media and the nanoporous diffusion media of the invention.

| Properties | Carbon-fiber paper | Carbon-fiber cloth | Nano-based GDM[†] |
|---|---|---|---|
| Thickness (mm) | 0.19 | 0.38 | 0.013 |
| Areal weight (g/m2) | 85 | 118 | 69 |
| Porosity (%) | 70 | 75 | 50 |
| Gas permeability (Darcys) | 8 | 55 | 15.3 |
| Electrical resistivity (through plane, mΩcm) | 80 | | $3.5 \times 10^{-3}$ |
| Electrical resistivity (in plane, mΩcm) | 5.8 | 9 | $5.2 \times 10^{-3}$ |
| Resistance (through plane, mΩcm2) | 0.009 | 0.005 | $<1.0 \times 10^{-3}$ |
| Mean pore size (μm) | ~30 | ~30 | ~30 |

[†]values derived using a copper substrate

In one embodiment the invention comprises a method or process for producing gas diffusion media using nanotechnology-based techniques; creating a gas diffusion media with nanometer-scale pores or hollow channels, which provide for fluid and/or gaseous communication between opposing surfaces of the gas diffusion media. The custom design and control of the design mask using currently available photolithographic processes allows for the generation of a gas diffusion layer with nanometer to micrometer sized pores of any desired size; geometric shape, for example, circular, elliptical, triangular, polygonal, and the like; number; density; diameter; or pattern using the methods of the invention.

It is contemplated by the inventors that the particular mask design selected may vary depending on any combination of factors including, the particular application, starting material, cost, desired functional parameters, etc., which can be modified by a person of ordinary skill using the teachings and methods of the invention without undue experimentation. In addition, use of the nano-scale photolithographic technique allows for the creation of non-overlapping, and optionally, variable sized pores which improves function of the gas diffusion media based on the application. Other embodiments and advantages will be apparent to those of ordinary skill in the art from the non-limiting examples provided below.

Exemplary Methods for Producing Nano-Porous Gas Diffusion Media

Example 1

Figure 5:
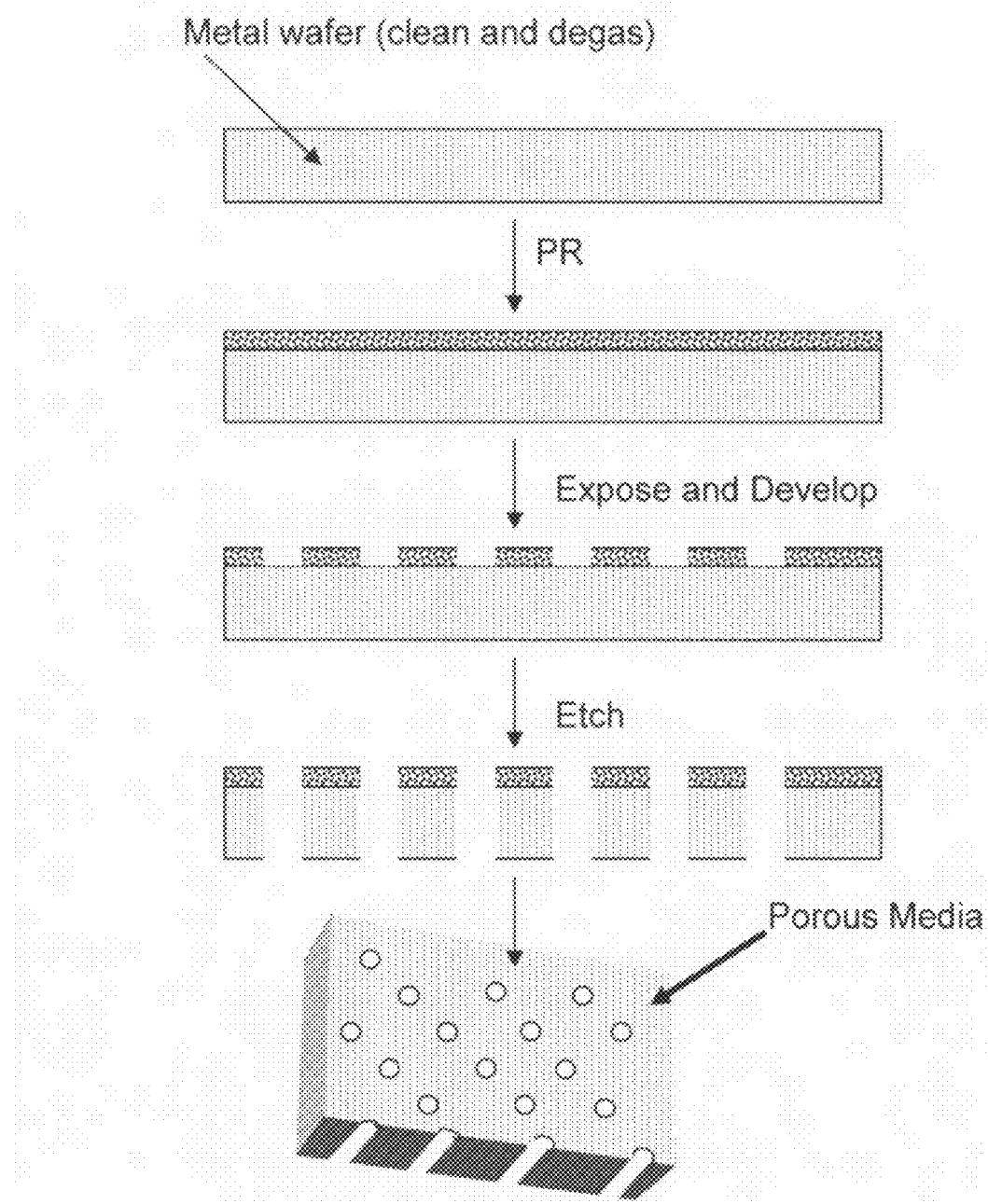
FIG. 5. Schematic of an example of one embodiment of the process of the invention.

With reference to FIG. 5: (1) Metal Preparation. The metal is thoroughly cleaned to remove all dirt, rust, greases and oils so that good adhesion to the photoresist to be obtained. (2) Photoresist Coating. Photoresists are UV light-sensitive polymers that are applied to the metal as a liquid by dip coating, flowing, roller-coating or electrophoresis. Dry film photoresists are applied by hot roller lamination. (3) Pattern and Cleaning. When this metal is exposed to UV light on both sides, a pattern is formed in the photoresist. This is then developed in a liquid formulation to form an adherent, durable image on both sides of the metal. (4) Etching. To maintain a constant etch rate, lower environmental impact and improve economics, etchant can be reused or regenerated in-house. (5) Stripping and Inspection. The resist is stripped off to ensure that the metal is clean and that the dimensional specifications requested have been satisfied. (6) Surface treatment process involving SAM Self-assembled monolayers (SAMs) are composed of a single layer of organic molecules adsorbed onto a surface to form a coating. Such coatings form upon chemisorptions of alkylthiols on metal surfaces.

Certain SAM compounds have terminal groups at the two ends of the molecule with very different chemical characteristics. For example, alkylthiol molecules have one end terminating with a HS group, the other end terminating with a $CH_n$ group. The HS group can strongly bond with metal atoms of the solid surfaces, permitting good adherence of the organic molecule to the surface. The attached molecules then self-assembled into a monolayer with the $CH_n$ group sticking up over the surface, as shown in FIG. 3. By appropriate choice of the terminal hydrocarbon group, different levels of surface energy can be obtained, hence controlling wetting characteristic of the solid surface. Compound with methyl termination, formed hydrophobic SAM regions, while ones with hydroxyl termination, formed hydrophilic SAM regions.

A SAM on copper substrate formed from octadecanethiol (ODT)-$HS(CH_2)_{17}CH_3$ exhibits hydrophobic characteristics with contact angles of >120 degrees with water. For copper substrate, the process is the following:

An oxide layer is formed on the surface of the substrate by immersing the copper into 30% Hydrogen peroxide solution for 8 hr, while stirring using a stir bar. The reaction is as follows: (a) $2Cu+H_2O_2 \rightarrow 2CuO+H_2$; (b) $2HSC_{18}H_{37}+CuO \rightarrow (SC_{18}H_{37})_2+Cu+H_2O$.

The copper is then removed from the hydrogen peroxide solution and immersed into a 2.5 mM solution of octadecanethiol (ODT) in ethanol to form the ultra thin organic film: $HSC_{18}H_{37}+Cu \rightarrow CuS-(CH_2)_{17}CH_3+½H_2$.

Test Conditions

An element cell having an active area of 10 $cm^2$ is prepared for evaluation of respective cells by making the gas diffusion layer prepared in Examples 2, 3, and 4. The fuel cell was operated at 70° C., with fully humidified inlet air and hydrogen. The operating pressure was 2 atm (abs). In all experiments, ultra-high purity hydrogen and standard dry air were used from compressed gas bottles.

Example 2

Figure 6:
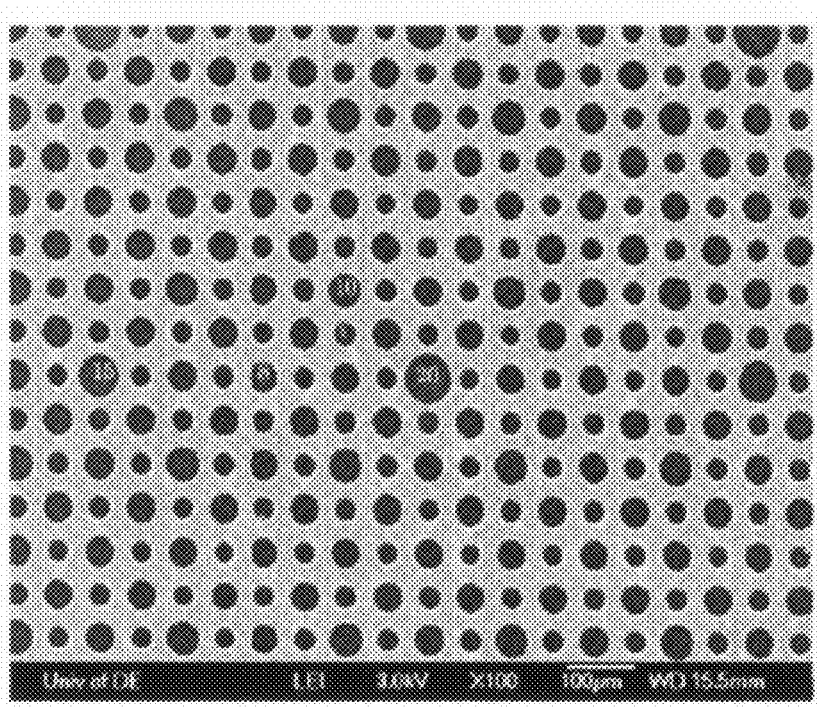
FIG. 6. Illustration of a typical SEM image of the copper GDM after 20 minutes of etching.
Figure 7:
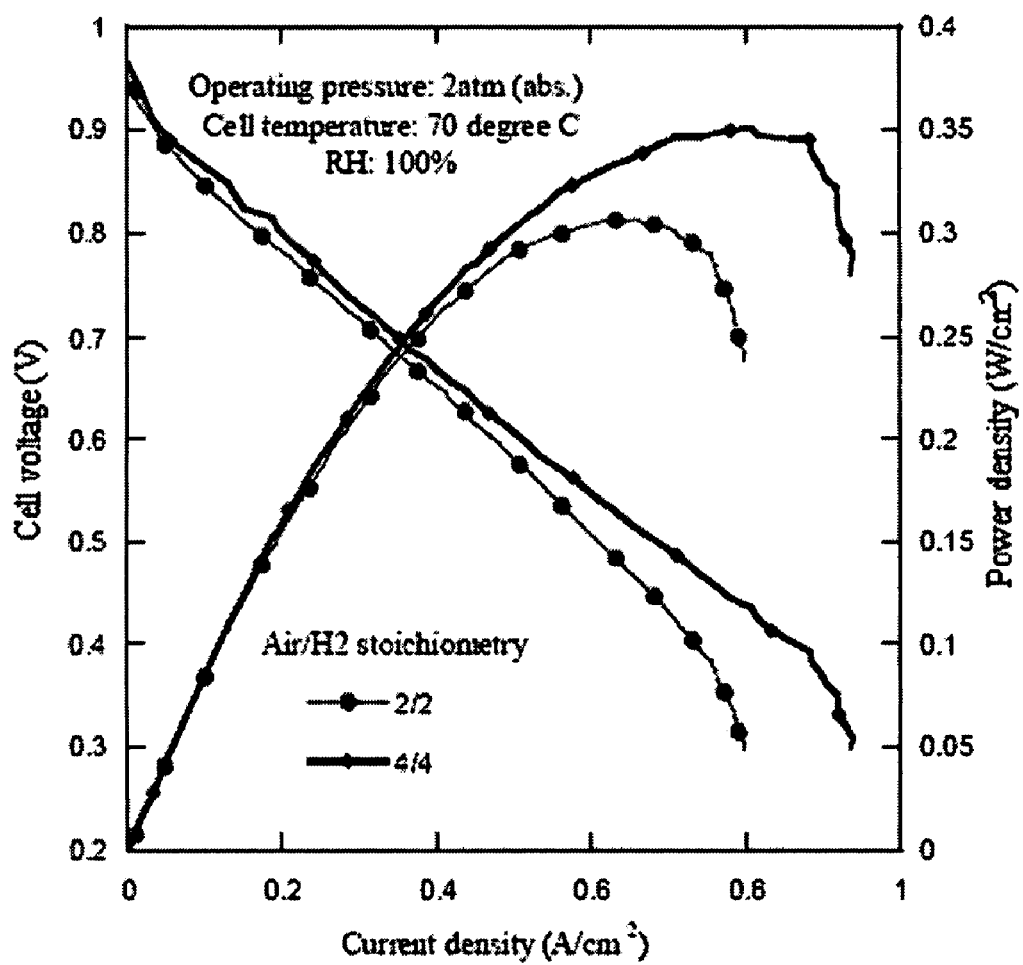
FIG. 7. Graph presenting polarization curves of the fuel cell using gas diffusion medium of example 1 under stoichiometry of 4/4 and 2/2 at 1 A/cm$_2$.
Figure 8:
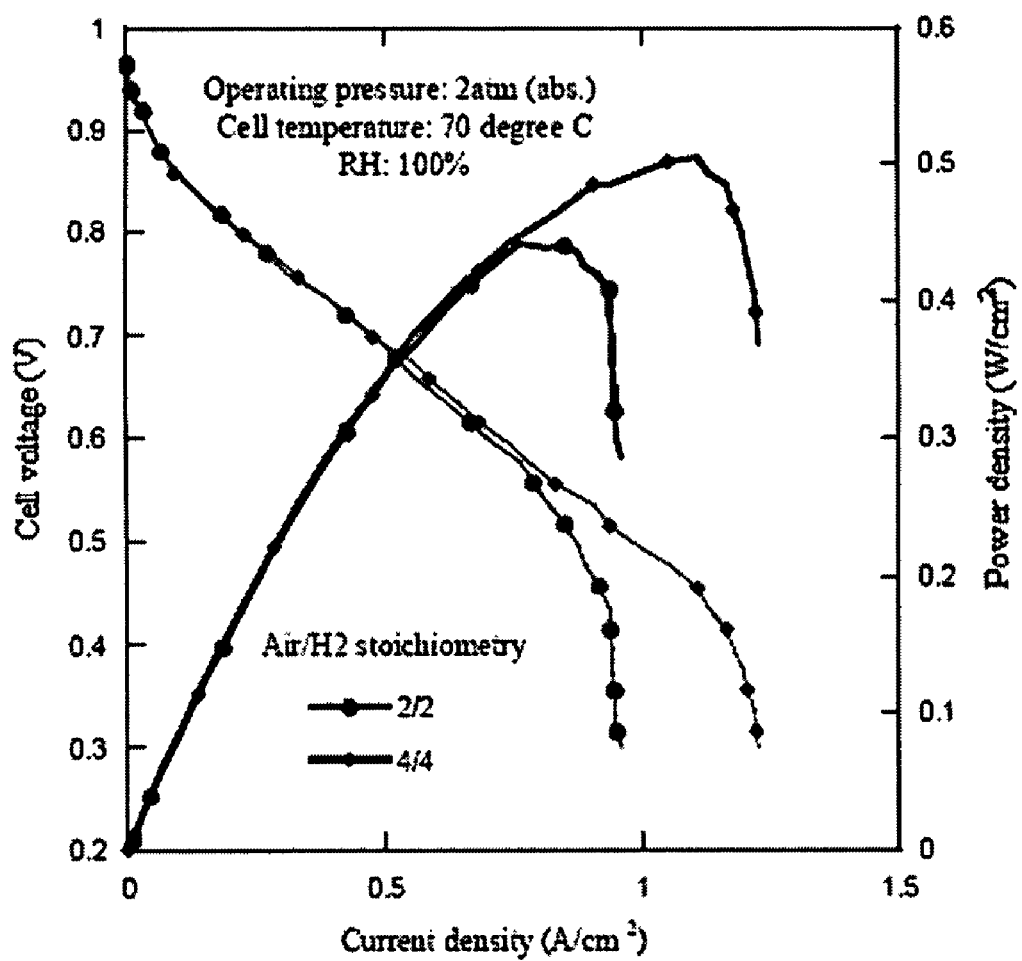
FIG. 8. Graph presenting polarization curves of the fuel cell using gas diffusion medium of example 2 under stoichiometry of 4/4 and 2/2 at 1 A/cm$^2$. The cell performance is improved due to the reduction in internal resistance owing to the presence of the microporous layer.
Figure 9:
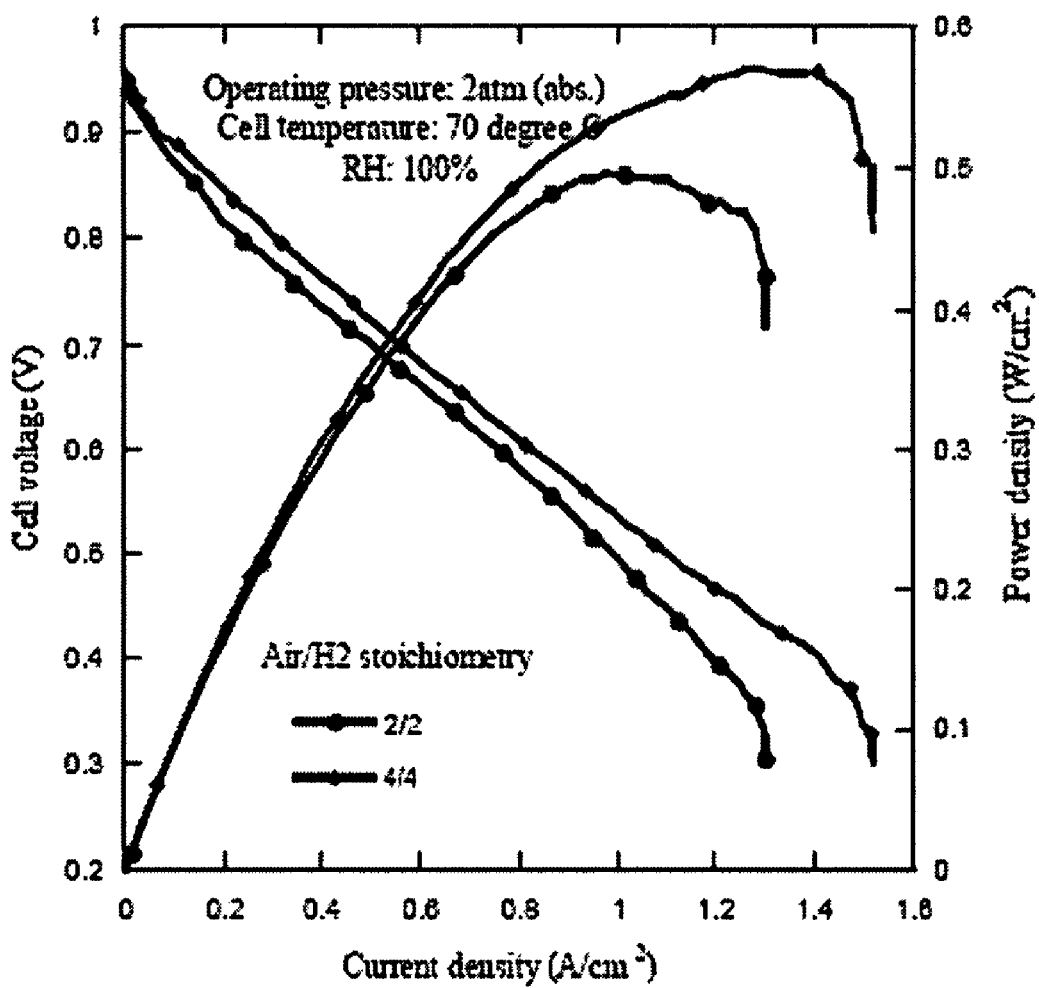
FIG. 9. Graph presenting polarization curves of the fuel cell using gas diffusion medium of example 3 under stoichiometry of 4/4 and 2/2 at 1 A/cm$^2$. The cell performance is drastically improved due to the enhancement of the in-plane gas transport by the insertion of a porous layer between the flow field and the copper foil, which increases the reaction area of fuel cell. A similar improvement can be expected using other methods that can improve in-plane transport permeability, as shown schematically in FIG. 10.
Figure 10:
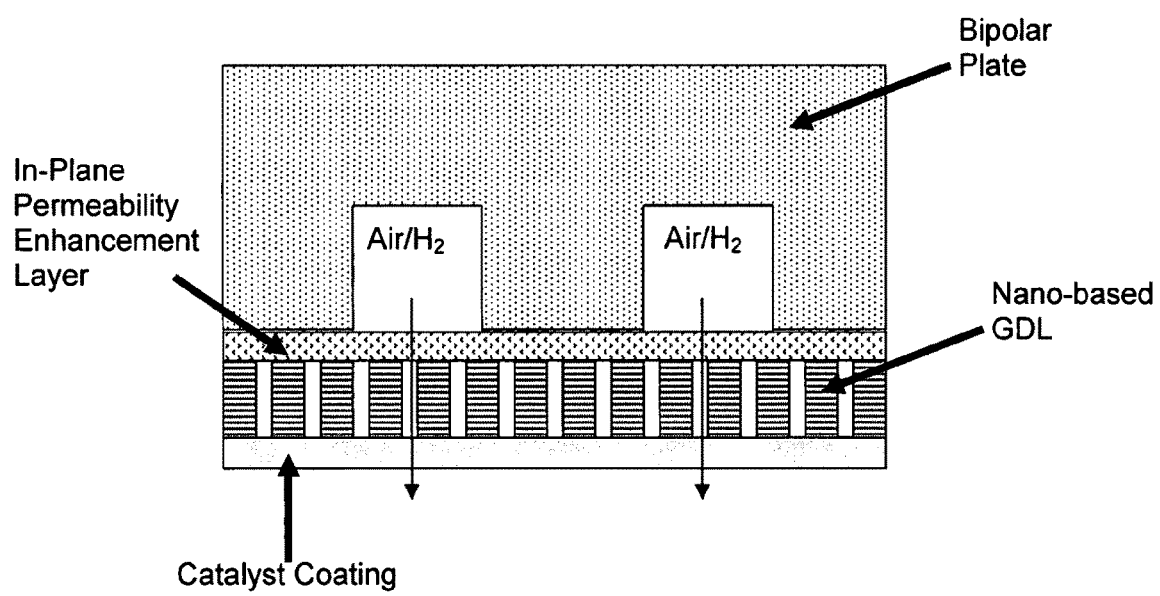
FIG. 10. Schematic of improvement of in-plane permeability created by the addition of a permeability enhancement layer.
Figure 11:
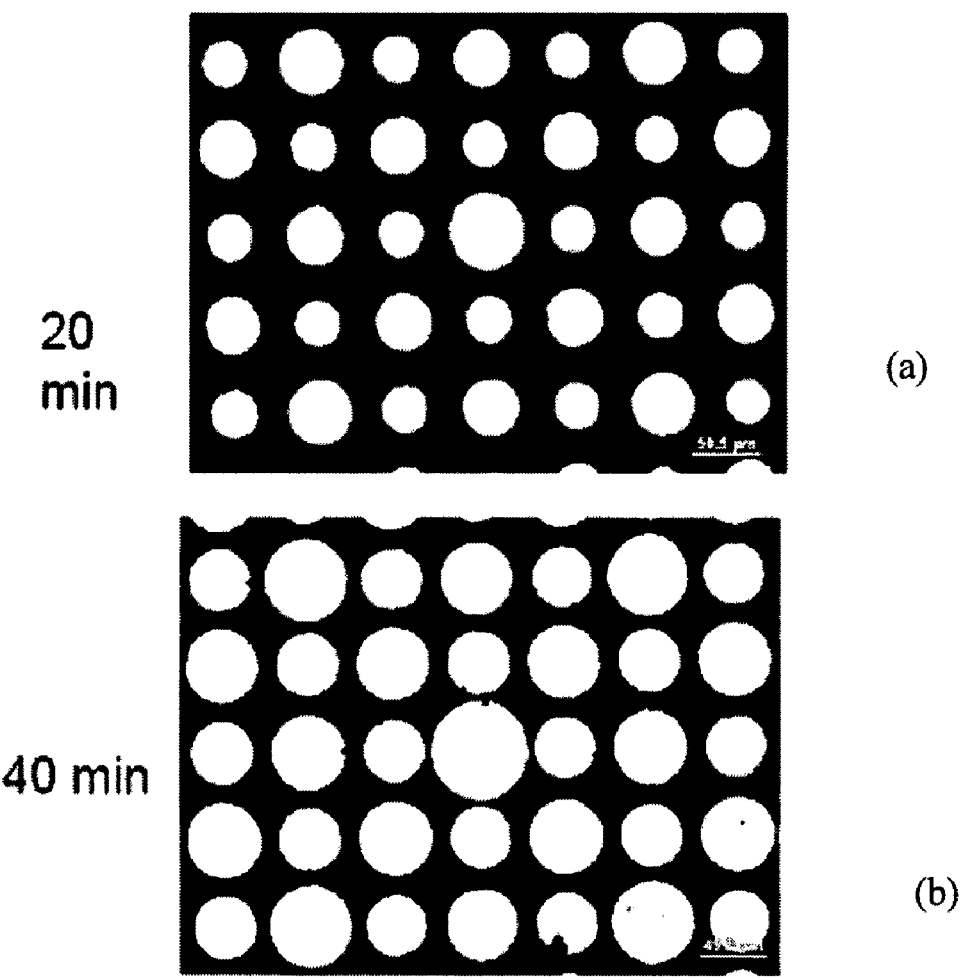
FIG. 11. Illustration of change in pore size and porosity with etching times of (a) 20 min. and (b) 40 min. The pore size and porosity can be controlled effectively by mask design and etching time.
Figure 12:
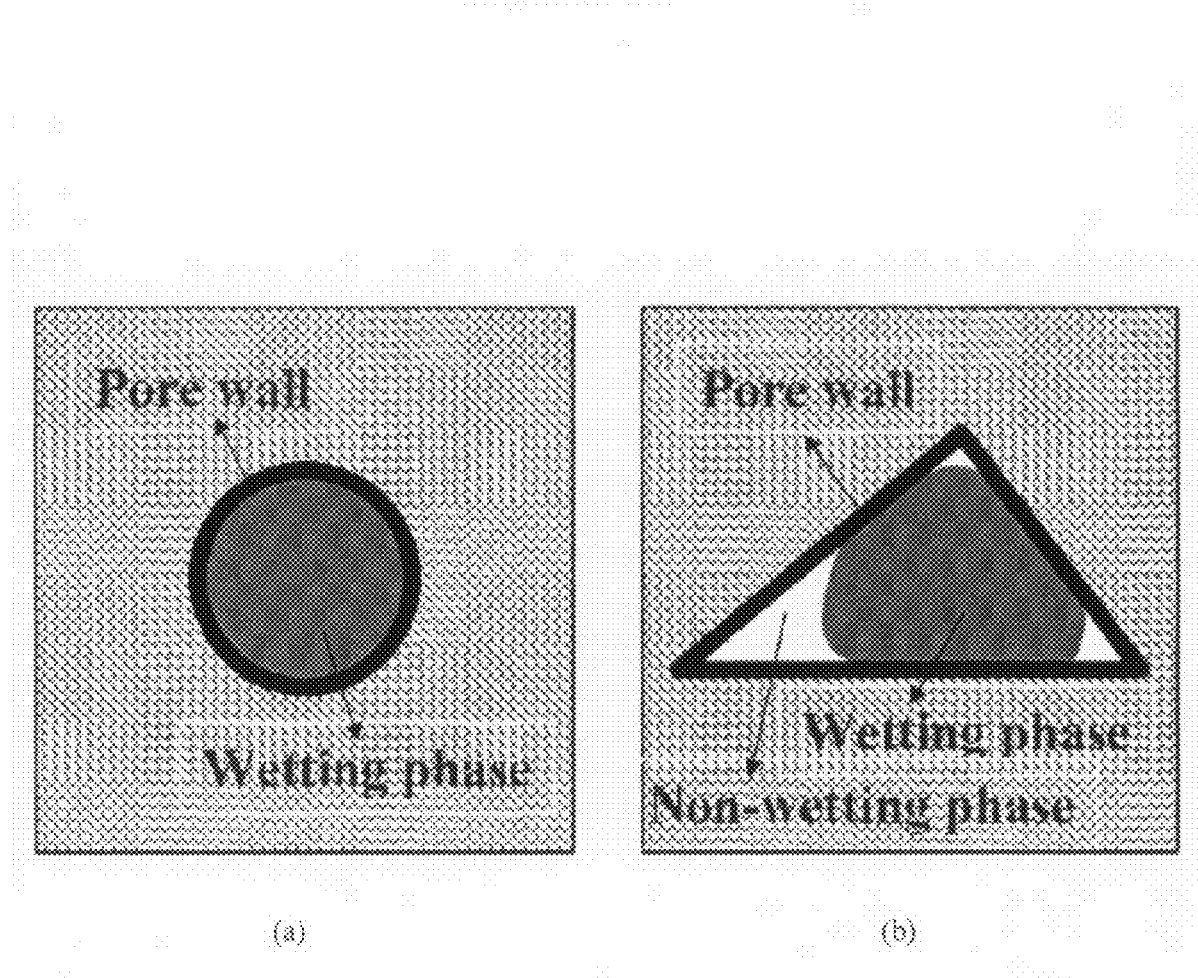
FIG. 12. Illustration comparing pore occupancy by liquid water in (a) circular and (b) non-circular hydrophobic pores. For a capillary with a circular pore, the liquid water fills the entire pore. In non-circular case, the liquid water occupies only a partial space of the pore, thereby allowing a simultaneous transport of gas through the uncovered region. The latter mechanism allows the gas diffusion media to transport the reactants in and the products out through partially covered pores and reduce flooding in the fuel cell.
Figure 13:
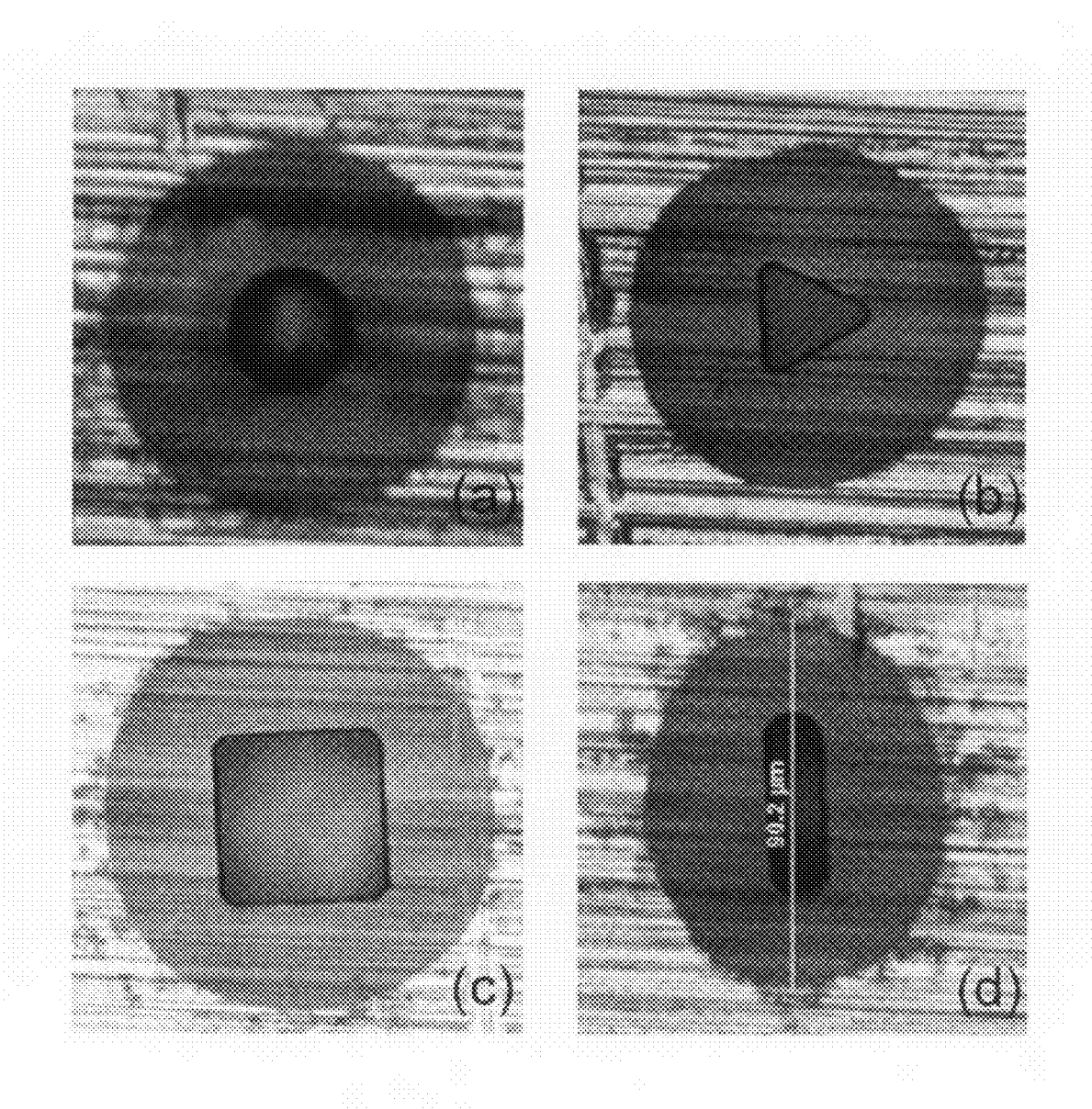
FIG. 13. Images showing the effect of mask shape on pore shape. The images were taken after 20 min of etching. The mask patterns of a circle, a triangle, a square and an ellipse are visible at the center of the images depicted in (a)-(d), respectively. It can be seen that the pore shape can be controlled by the shape of designed mask.
Figure 14:
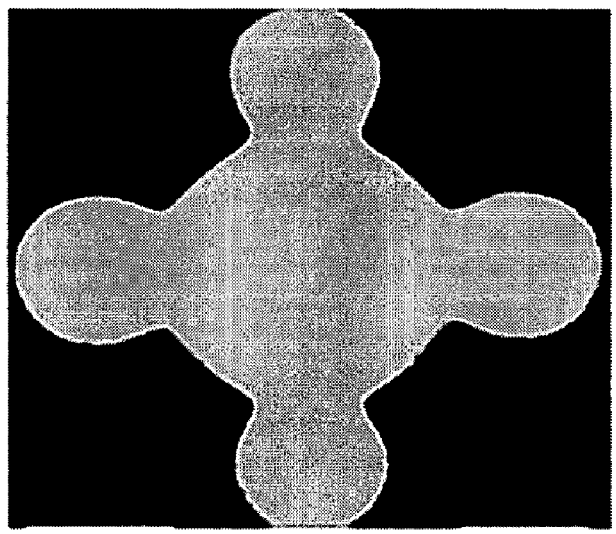
FIG. 14. Illustration showing non-circular shape obtained by designing the mask pattern which allows multiple pores to merge during etching. Non-circular shaped pores will be beneficial for two-phase transport through the GDM as discussed earlier for FIG. 12.

(1) A metal foil made of copper with thickness of 12.5 μm is cleaned and dried. (2) The porous copper foil is created by the mask-controlled wet etching of the material. Mask widths of 5, 8, 10, 15 and 20 μm were used for our application. FIG. 6 shows a SEM image of the copper GDM after 20 minutes of etching. The number inside the pore indicates the mask width in μm. The number density of mask diameters of 20, 15, 10, 8 and 5 μm (over a cell area of 1 mm 2) relative to the number density at 20 μm is 1, 1, 8, 54, and 64, respectively. The mean pore size after 20 min of etching is 35.65 μm, creating a porosity of approximately 21% on the copper GDM while the porosity of the copper GDM is about 21%. (3) The porous copper foil created by the aforementioned (2) is cleaned with acetone and DI water and dried.

Example 3

(1) A microporous layer (MPL) ink is prepared as follows: Vulcan XC-72 1 g, Triton X-100 0.2 g, PTFE (60 wt. %) 1.1 g, DI water 10 g, and isopropyl alcohol (IPA) 10 g as a pore-former are mechanically mixed in a mixer. (2) The obtained mixture by the aforementioned (1) is sprayed on the porous copper foil by the aforementioned Example 2. (3) The obtained material by the aforementioned (2) is dried at 80° C. for 30 min. Next, the material is sintered in a vacuum oven at 360° C. for 1 hour.

Example 4

A carbon paper SGL-GDL 31BA (thickness: 0.3 mm), manufactured by SGL Carbon Group, is used to enhance the in-plane transport by placement between the flow field and the porous copper foil in the aforementioned Example 2.

The invention claimed is:
1. A proton exchange membrane fuel cell (PEMFC) comprising
a porous metallic gas diffusion layer (GDL) comprising pores having a preselected, non-random size, shape, and distribution; wherein the GDL comprises pores of at least two sizes ranging from about 1 nm to about 300 μm, and a preselected porosity of from about 21% to about 95% by volume; and wherein the GDL is disposed adjacent to at least one of an anode side or a cathode side of the PEMFC.

2. The proton exchange membrane fuel cell of claim 1, wherein the porous metallic gas diffusion layer further comprises a self-assembling monolayer (SAM) of organic molecules bound to the outer surfaces.

3. The proton exchange membrane fuel cell of claim 2, wherein the SAM molecules are at least one of hydrophobic, hydrophilic, or a combination of hydrophobic and hydrophilic molecules.

4. The proton exchange membrane fuel cell of claim 3, wherein the SAM molecules comprise at least one anchoring group selected from the group consisting of a carboxylate, an amine, a siloxane, and a thiolate.

5. The proton exchange membrane fuel cell of claim 1, wherein the porous metallic substrate is comprised of at least one of aluminum, copper, platinum, tin, gold, silver, or a combination thereof.

6. The proton exchange membrane fuel cell of claim 3, wherein the SAM-treated surface has a contact angle with water selected from the group consisting of less than 90 degrees, greater than 90 degrees, and 90 degrees.

7. The proton exchange membrane fuel cell of claim 2, wherein the SAM molecules comprise at least one of 11-hydroxy-1-undecanethiol, 1-octadecanethiol, hexadecanethiol or a combination thereof.

8. A proton exchange membrane fuel cell (PEMFC) comprising
a porous metallic gas diffusion layer (GDL) comprising pores having a preselected, non-random size, shape, and distribution; wherein the GDL comprises circular and non-circular pores, pores of at least two sizes ranging from about 1 nm to about 300 μm, a preselected porosity of from about 21% to about 95% by volume, and a self-assembling monolayer (SAM) of organic molecules bound to the outer surface; and wherein the GDL is disposed adjacent to at least one of an anode side or a cathode side of the PEMFC.

9. The proton exchange membrane fuel cell of claim 8, wherein the SAM molecules are at least one of hydrophobic, hydrophilic, or a combination of hydrophobic and hydrophilic molecules.

10. The proton exchange membrane fuel cell of claim 9, wherein the SAM molecules comprise at least one anchoring group selected from the group consisting of a carboxylate, an amine, a siloxane, and a thiolate.

11. The proton exchange membrane fuel cell of claim 8, wherein the porous metallic substrate is comprised of at least one of aluminum, copper, platinum, tin, gold, silver, or a combination thereof.

12. The proton exchange membrane fuel cell of claim 9, wherein the SAM-treated surface has a contact angle with water selected from the group consisting of less than 90 degrees, greater than 90 degrees, and 90 degrees.

13. The proton exchange membrane fuel cell of claim 8, wherein the SAM molecules comprise at least one of 11-hydroxy-1-undecanethiol, 1-octadecanethiol, hexadecanethiol or a combination thereof.

14. The PEMFC of claim 1, wherein the GDL further comprises circular and non-circular pores.

15. A proton exchange membrane fuel cell (PEMFC) comprising a porous metallic gas diffusion layer (GDL) which includes pores of a preselected, non-random size, shape, and distribution; wherein the GDL includes pores are of at least two sizes ranging from about 1 nm to about 300 μm, circular and non-circular pores, and a preselected porosity of from about 21% to about 95% by volume; and wherein the GDL is disposed adjacent to at least one of an anode side or a cathode side of the PEMFC.

* * * * *